United States Patent [19]

Gentry

[11] 4,387,887
[45] Jun. 14, 1983

[54] STRUT CLAMP AND TEMPORARY SUPPORT

[76] Inventor: James C. Gentry, 21461 Encina Rd., Topanga, Calif. 90290

[21] Appl. No.: 214,081

[22] Filed: Dec. 8, 1980

[51] Int. Cl.³ .............................................. B23Q 3/02
[52] U.S. Cl. ................................... 269/100; 269/101; 269/303; 269/904
[58] Field of Search ................. 269/904, 132, 95, 100, 269/101, 289 R, 303, 254 R, 47, 49; 29/262, 265; 248/73, 221.4, 222.1, 243, 297.2

[56] References Cited

U.S. PATENT DOCUMENTS

| | | | |
|---|---|---|---|
| 757,987 | 4/1904 | Wiles | 81/DIG. 1 |
| 1,673,397 | 6/1928 | Corkum | 29/262 |
| 1,826,631 | 10/1931 | Payne | 29/262 |
| 2,364,477 | 12/1944 | Sayles et al. | 81/DIG. 1 |
| 2,940,718 | 6/1960 | Beal | 248/297.2 |
| 3,074,156 | 1/1963 | Hinrichsen et al. | 29/262 |
| 3,721,412 | 3/1973 | Kindorf | 248/73 |
| 3,847,489 | 11/1974 | Van Riper | 248/297.2 |
| 3,848,844 | 11/1974 | Barrett | 248/297.2 |

*Primary Examiner*—Robert C. Watson
*Attorney, Agent, or Firm*—Allan M. Shapiro

[57] ABSTRACT

The strut tool has a frame with a pair of clamp faces on the front thereof and a pair of clamp hooks extending therebetween. A screw pulls the clamp hooks towards the clamp faces so that the strut clamp can engage on and clamp on a slotted strut to temporarily support structure with respect to the strut while the structure is being secured to the strut.

2 Claims, 4 Drawing Figures

U.S. Patent  Jun. 14, 1983  4,387,887
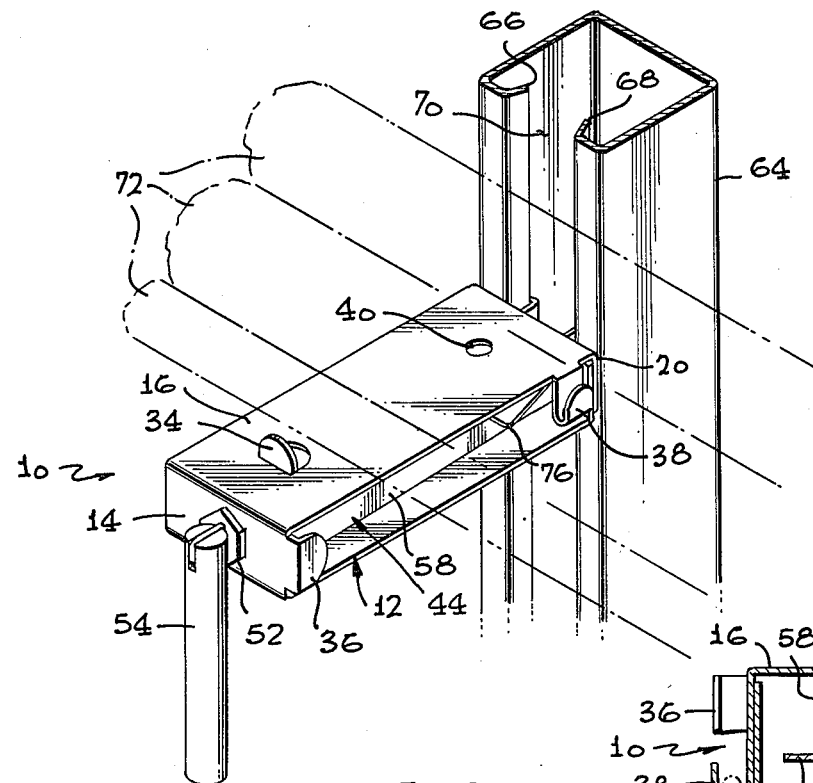
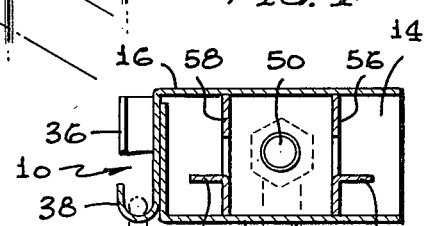
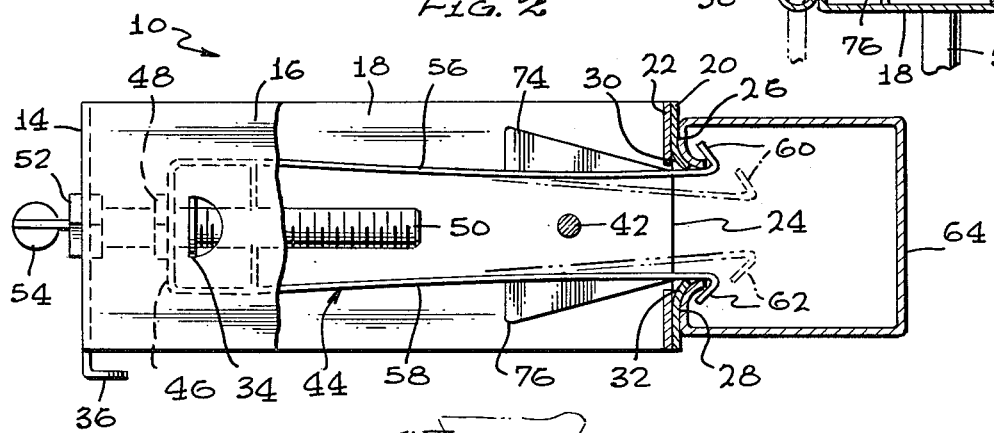
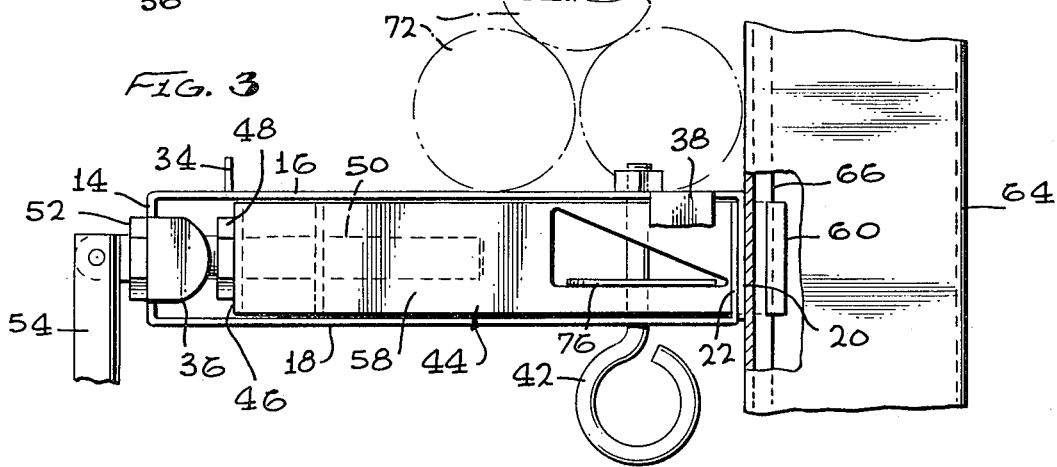

STRUT CLAMP AND TEMPORARY SUPPORT

BACKGROUND OF THE INVENTION

This invention is directed to a strut clamp particularly arranged for clamping onto a construction strut during the securement of pipes and conduits and other related structural devices to the strut.

Modern buildings, factories, power plants, and various types of process industries have tunnels and galleries therein wherein tubes and pipes convey fluids from place-to-place, and wherein conduits and cables convey electric power and signals from place-to-place. In order to support these structures, the galleries and tunnels are fitted with upright struts, usually along the wall and sometimes away from the wall. The pipe, conduit and cables are then secured to the struts so that they are adequately supported, but they are conveniently accessible should maintenance or rearrangement be required.

One common type of strut is formed as a U-shaped channel in order to maximize strength and rigidity from a particular amount of material. The open side of the U of such a strut usually has an inwardly facing lip. A commonly commercially available strut of this nature is available under the trademark "Unistrut." Such struts support the structure by bands extending around the struts or through holes in the sidewalls of the strut.

In the original building processes and in the rearrangement and maintenance of the structures, it is helpful to be able to support the pipe, conduit, cable and other related structures in a temporary manner so that they can be lined up in a parallel and level installation, as required. After the temporary location, then the more permanent attachment of the structures in place against their struts can be accomplished. Thus, there is need for a tool which clamps against such struts to serve as a temporary support for those structures during their installation, and it is preferable that such a tool is in the form of a strut clamp that can be placed anywhere along the height of the strut for convenience in installation.

SUMMARY OF THE INVENTION

In order to aid in the understanding of this invention, it can be stated in essentially summary form that it is directed to a strut clamp and temporary support which has a frame, and at least one clamp face on the front of the frame and at least one clamp hook extending out of the frame and means to pull the hook with respect to the face so that the clamp face can engage upon a strut and the hook can engage therein, to clamp the strut clamp as a temporary support onto a strut.

It is, thus, an object of this invention to provide a strut clamp which is configured to engage on a strut in a gallery for the temporary support of structures extending through the gallery so that they can be aligned and then permanently attached to the struts. It is another object to provide a temporary support tool for engaging against a strut for providing temporary support during the installation of structures and their attachment to the support. It is yet another object of this invention to provide a reusable strut clamp which is temporarily attached on a strut and can be later removed for use in a different position on that strut or on a different strut.

The features of the present invention which are believed to be novel are set forth with particularity in the appended claims. The present invention, both as to its organization and manner of operation, together with further objects and advantages thereof, may be best understood by reference to the following description taken in conjunction with the accompanying drawings.

BRIEF DESCRIPTION OF THE DRAWINGS

FIG. 1 is an isometric view of the strut clamp and temporary support of this invention shown in association with and clamped to an upright strut.

FIG. 2 is an enlarged plan view thereof, with parts broken away and parts taken in section.

FIG. 3 is a side elevational view thereof, with parts broken away.

FIG. 4 is a vertical section through the strut clamp from just behind the clamping face and looking towards the screw end.

DESCRIPTION OF THE PREFERRED EMBODIMENT

The strut clamp and temporary support of this invention is generally indicated at 10 in FIGS. 1, 2, 3 and 4. It comprises rectangular frame 12 which is of boxey construction. In view of the strut clamp 10 is intended to be used in large quantities, it is helpful that it be inexpensively constructed. Furthermore, while intended as a temporary support, the strut clamp 10 may be left in place, if the construction thereof is sufficiently economical. For this purpose, the strut clamp frame 12 is bent of a single piece of stamped sheet metal. Back wall 14 is substantially the center point, and top and bottom walls 16 and 18 are bent forwardly therefrom at substantially right angles and extend forward to the front of strut clamp 10. At the front, top wall 16 is bent downward to form front wall 20 and bottom 18 is bent up to form wall 22 which lies inside of front wall 20. The walls 20 and 22 have an opening 24 therebetween so that the walls are really faces extending down and up from the top and bottom walls. Front wall 20 provides clamp faces 26 and 28 on the opposite sides of opening 24 and wall 22 backs up the clamp faces to strengthen them. Clamp faces 26 and 28 have outwardly turned guide ridges 30 and 32 adjacent opening 24.

As will be apparent from a study of FIGS. 1, 2, 3 and 4, this unitary piece of material which makes up the frame 12 is provided with several stops and hooks thereon. Stop 34 (see FIGS. 1 and 3) is an upturned tab extending upwardly from top 16 adjacent its end away from clamp faces 26 and 28. Hook 36 is integrally formed with back wall 14 and is directed towards the clamp faces. Hook 38, see FIGS. 1 and 4, is formed on top wall 16 closely adjacent the clamp faces and has its hook opening directed upwardly in the orientation shown in FIG. 1. Stop 34 and hooks 36 and 38 are aids to engagement of structure on strut clamp 10. Additionally, hole 40, see FIG. 1, extends through the top and bottom walls 16 and 18, again closely adjacent the clamp faces. This hole accepts a hook bolt or eyebolt, such as eyebolt 42 illustrated in FIG. 3, which is used for the support of structures.

Clamp hook assembly 44 is most completely shown in FIGS. 2 and 3. It is a generally U-shaped structure with back 46. Back 46 has threads therein, for example by nut 48 pressed into a suitable hole in back 46 or spot-welded to back 46, or other conventional fastening means. Screw 50 is externally threaded in and engaged in nut 48. Screw 50 engages through thrust collar 52 which is fixed on the screw and freely rotates in a hole through back wall 14. Handle 54 is secured to the outer end of screw 50. As illustrated in FIGS. 1, 2 and 3, handle 54 is bifurcated and is pivoted on the flat end of screw 50 so that handle 54 can swing to either side, as desired. With this structure, by rotating screw 50, clamp hook assembly 44 moves towards and away from the clamp faces 26 and 28.

Clamp hook assembly 44 has arms 56 and 58 which are integrally formed with back 46 and extend forwardly through opening 24. Forward of the opening 24, arms 56 and 58 respectively carry clamp hooks 60 and 62. The clamp hooks 60 and 62 are configured to extend forward of the clamp faces 26 and 28 and to face those clamp faces.

Strut 64 is illustrated in FIGS. 1, 2 and 3. It comprises a U-shaped structure of uniform cross section, often with holes in the side walls. It may be extruded, rolled or bent into the cross section illustrated. On its open wall, it has inwardly directed lips 66 and 68 with an opening 70 therebetween. The guide ridges 30 and 32 are configured and dimensioned to engage between the lips 66 and 68 and extend partway into the opening 70, as illustrated in FIG. 2, when the clamp faces 26 and 28 are engaged against the open side of the strut. This prevents rotation of the strut clamp 10 with respect to strut 64 when the strut clamp is secured to the strut. Clamp hooks 60 and 62 are dimensioned and configured to engage and hook on lips 66 and 68, as illustrated in FIG. 2, so that when the clamp hooks are engaged in place and the clamp hook assembly 44 tightened with screw 50, the clamp hooks engage on the lips to clamp the strut clamp 10 against strut 64. When the strut is in the upright position illustrated in FIG. 1, hook 38 and eye 42 can be used to support structures with respect to the strut clamp. Furthermore, when such structures as pipe, conduit or cable 72 lie on the top wall 16 of clamp 10, as illustrated in FIGS. 1 and 3, stop 34 tends to prevent them from sliding or rolling off. For cases where the strut 64 is horizontally directed in an overhead position, hook 36 can be used for supporting structures therefrom.

When the structures are first temporarily supported by the strut clamp 10 and then secured in place by other fastening means, release of the strut clamp 10 is required. In order to facilitate release, wings 74 and 76 are formed on arms 56 and 58. As previously indicated, the structure is made of sheet metal, and the wings are stamped out of the arms, as indicated in FIGS. 3 and 5. Wings 74 and 76 are dimensioned and positioned so that as the clamp hook assembly 44 is released, as screw 50 is unscrewed, the clamp hook assembly 44 moves to the right in FIGS. 2 and 3 so that wings 74 and 76 engage in the sides of opening 24 and thrust the arms 56 and 58 together with their clamp hooks 60 and 62 together to the dotted line position shown in FIG. 2. In this position, the hooks are sufficiently close together that they can be withdrawn between the inwardly directed lips 66 and 68 of strut 64. In this way, strut clamp 10 can be easily released from the strut so that it can be conveniently reused. Thus, the strut clamp 10 provides a temporary support for various structures during their attachment to supporting struts.

This invention has been described in its presently contemplated best mode, and it is clear that it is suceptible to numerous modifications, modes and embodiments within the ability of those skilled in the art and without the exercise of the inventive faculty. Accordingly, the scope of this invention is defined by the scope of the following claims.

What is claimed is:

1. A strut clamp comprising:

a frame, a front wall on said frame, an opening in said front wall so that a clamp face is defined by said front wall on each side of said opening in said front wall, said clamp faces facing in a first direction and being for engagement on a strut on opposite sides of an opening in the strut;

a clamp hook assembly movably mounted with respect to said frame, said clamp hook assembly having first and second clamp arms, first and second clamp hooks mounted on said first and second clamp arms, said first and second clamp hooks extending between said clamp faces and facing away from each other, said clamp hooks being positioned so that said first clamp hook faces said first clamp face and said second clamp hook faces said second clamp face so as to clamp a strut against both of said clamp faces, said arms each having an angularly oriented wing thereon so that said first and second clamp hooks are moved closer together as said clamp assembly is moved in said first direction;

tightening means engaged between said frame and said clamp hook assembly for moving said clamp hook assembly in said second direction with respect to said frame to clamp a strut between said clamp hooks and said clamp faces; and means on said strut clamp for supporting structures which are to be supported with respect to said strut.

2. A strut clamp for the support of a structure with respect to a strut, said strut clamp comprising:

a frame, said frame having a back wall, a front wall and a wall extending therebetween and joined thereto, said front wall having first and second clamp faces thereon facing in a first direction away from said back wall;

a clamp hook assembly, said clamp hook assembly having an arm thereon extending between said clamp faces and having a hook thereon positioned beyond said clamp faces, said hook being open in a second direction generally opposite to said first direction, a wing on said arm adjacent said clamp hook, said wing engaging on the edge of said clamp face when said arm moves in a first direction to move said clamp hook away from said clamp face and a lip on the strut;

adjustment means between said frame and said hook assembly for moving said clamp hook in a direction towards and away from said clamp faces so that said clamp hook can engage on the lip in a strut and said clamp faces can engage against the strut to clamp said strut clamp against the strut; and means on said frame for the support of structure so that structure can be supported by said strut clamp with respect to the strut.

* * * * *